United States Patent [19]

Mackichan

[11] Patent Number: 5,461,497
[45] Date of Patent: Oct. 24, 1995

[54] PHOTONIC AMPLIFIER

[75] Inventor: John C. Mackichan, Suffolk, England

[73] Assignee: British Telecommunications, public limited company, England

[21] Appl. No.: 119,127

[22] PCT Filed: Mar. 23, 1992

[86] PCT No.: PCT/GB92/00524

§ 371 Date: Sep. 20, 1993

§ 102(e) Date: Sep. 20, 1993

[87] PCT Pub. No.: WO92/17008

PCT Pub. Date: Oct. 1, 1992

[30] Foreign Application Priority Data

Mar. 22, 1991 [GB] United Kingdom .................. 9106181

[51] Int. Cl.⁶ .......................... H04B 10/17; H04B 10/16
[52] U.S. Cl. ................................. 359/177; 359/179
[58] Field of Search ................................. 359/110, 174, 359/177, 179

[56] References Cited

U.S. PATENT DOCUMENTS

| | | | |
|---|---|---|---|
| 4,995,100 | 2/1991 | Stallard | 359/187 |
| 5,023,863 | 6/1991 | Masuda | 359/124 |
| 5,117,196 | 5/1992 | Epworth | 359/181 |

*Primary Examiner*—Leslie Pascal
*Attorney, Agent, or Firm*—Nixon & Vanderhye

[57] ABSTRACT

This invention relates to photonic amplifiers, e.g., fibre amplifiers, which are specially suitable for use in long distance telecommunications optical linkages. The amplifier includes an optical transmitter, which is adapted to provide to the output of the amplifier a default signal which is digitally modulated and the digital modulation includes the identity of the amplifier. The default condition is constituted when the traffic signals fall below a preset level, e.g., in the case of a cable break when the signal falls to zero. In a preferred embodiment, the traffic signals are modulated with a control tone which is used to control the AGC's of the telecommunications link. In this system, the default condition is constituted when the level of control tone falls below a predetermined level, and the default signals also contain control tone, so that subsequent amplifiers are held out of default state.

10 Claims, 3 Drawing Sheets

PHOTONIC AMPLIFIER

BACKGROUND

I. Field of the Invention

This invention relates to photonic amplifiers and especially to photonic amplifiers which are intended for use in a long series of amplifiers.

II. Related Art and Other Considerations

Photonic amplifiers are used in telecommunications, e.g. in optical submarine cable systems, and it is desirable that such systems should include provision to indicate the probable location of certain faults. Specifically it is desirable to provide for the approximate location of a broken link which, of course, completely terminates any communication across the break. Clearly, a break implies that signal levels fall to zero. In addition to the breakage of a link, a similar condition occurs due to the deterioration of components. Thus, the failure of an amplifier would be equivalent to a break, and the deterioration of an amplifier would result in loss of gain whereby signal levels might fall to an unacceptably low level. Conditions such as the total loss of signal would probably be noticed in any system. However the location of the fault may not be apparent in a larger system and it is the object of this invention to provide information which helps to locate a fault.

A photonic amplifier amplifies optical signals using laser action, that is, signal photons stimulate the emission of similar photons whereby the signal is amplified. It is convenient to distinguish between two types of photonic amplifier by reference to the nature of the lasing medium. In the first type, the lasing medium is a semiconductor and the amplifier has a complicated structure involving several functional regions and interfaces. In the case of a semiconductor amplifier, the power to drive the amplification is provided by an electric current from a suitable electronic circuit. In the second type of amplifier, the lasing medium is an optical fibre which is doped with a lasing species such as Nd or Er. In the case of a fibre amplifier, the power for the amplification is provided in the form of pump radiation which may have a shorter wavelength than the signal radiation. The pump radiation produces a population inversion in the lasing species in accordance with the well known theory for the operation of lasers.

SUMMARY

In accordance with this invention a photonic amplifier which includes a detector means and a distress transmitter, the said detector means capable of detecting valid signals which include a control tone modulated onto a traffic signal, in normal operation, on receipt of valid signals the detector means is adapted to disable the distress transmitter, and the distress transmitter when enabled to provide to an output of the amplifier an optical distress signal which is recognisable as a valid signal and which is modulated with information which includes the identity of the amplifier. More specifically, the default condition occurs when the signal level falls to an unacceptably low level. As mentioned above, the case where the signal falls not merely to a low level, but to zero is of particular interest. In accordance with the invention, a photonic amplifier, for use with signals modulated with a control tone, wherein the detector means is configured to disable the distress transmitter when control tone above a predetermined level is detected, and to enable the distress transmitter when control tone below the predetermined level is detected, and wherein the distress transmitter produces a distress signal modulated with control tone such that said distress signal disables the distress transmitters of similar amplifiers, to which the amplifier may be connected. The distress signal adopts the same signal format as the normal signal so that subsequent amplifiers remain in the normal configuration. It should be understood that normal traffic signals are digitally modulated, and therefore the distress signal can also be digitally modulated. According to another aspect of this invention the distress signal is digitally modulated with the identity of the originating amplifier in order that the location of the fault is at least partially indicated. It is emphasised that, because the distress signal adopts the same signal format as the normal signal, only one amplifier of the series will adopt the distress mode and this simplifies the decoding of the distress information modulated onto the distress signal.

Usually an amplifier includes an automatic gain control, i.e. AGC. An AGC is generally used because it is good engineering practice to maintain the output of an amplifier at a predetermined level. If the level of the received signal falls, e.g. if any of the faults mentioned above occur, there is a danger that the AGC will be driven into an overload condition as it tries to achieve the impossible. It is therefore good practice that an AGC be provided with overload protection in order to reduce the risk of damage to any of the circuitry. For the purposes of the present invention, it is possible to utilise the overload protection of the AGC as the indication of the default condition. According to one embodiment of this invention the distress signal is initiated when the overload protection of the AGC comes into operation. In a second embodiment the distress signal is initiated when the input to the AGC falls below a preset level.

Many optical telecommunication systems utilise a control tone which is a low frequency signal which is amplitude modulated onto the optical signal in addition to the digital modulation to carry the traffic. Frequencies of a few kilohertz, e.g. 5–30 KHz, are suitable for use as the control tone. One of the reasons for using the control tone is that there can be several optical signals present in the system. For instance it is possible that the system may contain optical noise as well as the optical signal and, in a default case, all the optical energy may be noise. It can be difficult to distinguish one optical signal from another and the detection of the control tone provides a convenient way of recognising that the traffic signal is present, and measuring the level of the control tone is a convenient way of measuring the level of the traffic signal. In fact, the AGC of many fibre amplifiers operates by keeping the level of the control tone constant, rather than by acting directly on the signal. At the originating station, the ratio of modulation to traffic signal is maintained constant, and under these conditions maintaining a constant level of control tone has the effect of maintaining a constant traffic signal level. With systems of this nature the AGC will saturate if the level of the control tone drops and this saturation will initiate the default condition described above. In other words the distress mode is initiated when the level of the control tone drops to an unacceptable level. It will be appreciated that it is also possible to actuate the distress mode by direct measurement of a control tone, as well as the indirect technique of relying on the AGC. EP Patent Specification 331 304 describes an AGC for semi-conductor amplifiers. This AGC operates without breaking into the optical circuit, and it mentions the use of a control tone which is modulated onto the optical signals.

As mentioned above, it is an important feature of this invention that the distress signal has the same format as the normal signal. In the case of a system which uses a control tone it is, therefore, important that the distress signal be modulated with the same control tone as is used in a normal signal. Subsequent amplifiers, which receive the distress signal, will therefore receive a normal control tone and they will therefore remain in the normal configuration. EP Patent Specification 331304 (mentioned above) has a default configuration in which the semi-conductor amplifier provides a distress signal when the traffic signal becomes unacceptably weak. However the normal control tone is not utilised in the distress configuration, and therefore all subsequent amplifiers adopt a distress configuration. This is an important difference between the distress configuration described in EP331304 and the distress configuration of this invention.

A single optical linkage is constituted by at least one optical fibre together with as many amplifiers as may be necessary. It will be appreciated that telecommunication systems, especially submarine systems, are required to transmit traffic over substantial distances, e.g. up to 5,000 kilometres or even higher. After a distance of about 100 kilometres an optical fibre attenuates the signal to a level at which it is becoming difficult to detect and, therefore, it is necessary to amplify the signal. Therefore amplifiers are spaced at distances of 100 kilometres, or less if more cautious design parameters are used. It will be noted that, depending on the length of the link, there may be only one or two amplifiers in the series or a substantial number, e.g. 50 or more. If a fault occurs, e.g. if one of the optical fibres breaks, the amplifier after the break will adopt the distress mode and transmit a distress signal which includes its identity and this helps to establish the location of the break. In addition, the distress signal will keep all subsequent amplifiers in the normal mode. It should also be noted that, in most cases, the single linkage described is capable of transmitting information in one direction only. Therefore the submarine system will include another linkage for transmitting information in the reverse direction. The photonic amplifiers according to the invention are usually incorporated into repeaters which, for submarine systems, comprise a watertight, tubular hull which is connected at both ends to submarine cables. The hull contains a plurality of amplifiers together with a power supply for driving the amplifiers. The power is derived from electric conductors constituted in the submarine cables. The repeater usually contains an even number of amplifiers, e.g. 4, 6 or 8, in order to provide the same traffic capacity in both directions.

BRIEF DESCRIPTION OF THE DRAWINGS

The invention will now be described by way of example, with reference to the accompanying drawings in which.

DETAILED DESCRIPTION OF THE DRAWINGS

Figure 1:
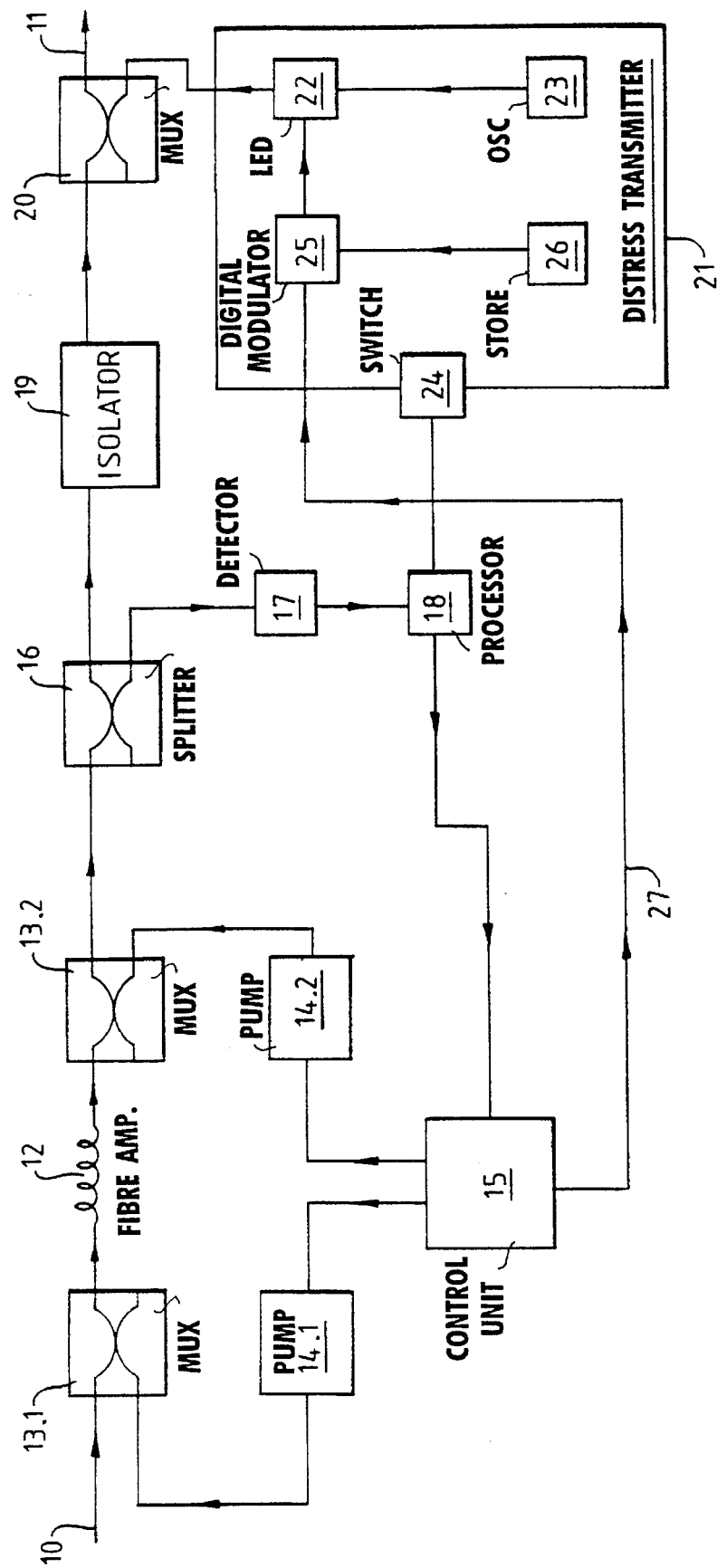
FIG. 1 is a block schematic diagram of a fibre amplifier including a distress caller, in accordance with the invention.

The photonic amplifier shown in FIG. 1 has an input port 10 which takes the form of an optical fibre adapted for connection to a transmission fibre, so that the amplifier can receive signals. The amplifier also includes an output port 11 which also takes the form of an optical fibre. The output port 11 is also adapted for connection to a transmission fibre in order that amplified signals may be transmitted to the rest of the system, e.g. to more amplifiers as illustrated in FIG. 1. It should be noted that the transmission fibres are not shown in FIG. 1 because the transmission fibres are not part of the amplifier.

A fibre amplifier medium 12 interconnects the input and output ports 10 and 11. This is a conventional Er doped fibre and it requires pump radiation to provide the power for amplification.

The pump arrangements are constituted by multiplexers 13.1 and 13.2 which are situated at opposite ends of the fibre 12. The multiplexers 13.1 and 13.2 are connected to pumps 14.1 and 14.2 and these pumps take the form of semi-conductor lasers which provide pump radiation at a wavelength suitable for producing a population inversion in the Er dopant in the fibre 12. The electrical drive to the pumps 14.1 and 14.2 is provided and controlled by a control unit 15. The provision of two pumps constitutes a redundancy feature to prolong the life of the amplifier should one of the pumps fail. The control unit 15 selects one of the pumps, usually 14.1, to provide the pump radiation and it also controls the intensity of the radiation in order to control the gain in the amplifier. The control unit 15 preferably includes monitoring circuits to ascertain the operational status of the amplifier, e.g. to detect if both pumps 14.1 and 14.2 have failed.

Three components are located between the multiplexer 13.2 and the output port 11. These are a splitter 16, an isolator 19, and a multiplexer 20. The splitter 16 which provides 90% of the output of the amplifier to the output port 11 and 10% to control circuitry to be described below. The splitter 16 is connected to the output port 11 via the isolator 19 and the multiplexer 20. The multiplexer 20 allows both the output of the fibre and the distress transmitter 21 (described below) to be provided to the output port 11. In normal use the isolator 19 prevents the reflection of traffic signals back into the amplifier 12. Such reflections are possible and, if permitted, they would cause the amplifier to go into oscillation and generate unacceptable noise. The isolator 19 reduces these reflections sufficiently to prevent oscillation. In the distress mode, the isolator 19 prevents distress signals from the multiplexer 20 arriving at the splitter 16.

An AGC includes an optical detector 17 which receives 10% of the output of the fibre 12 from the splitter 16. The detector 17 converts its optical input into an electrical signal. However the detector 17 is not wavelength sensitive and, therefore, it converts not only traffic signals but also noise into the same electrical signal. In addition, the detector 17 will receive 10% of the output of pump 14.1 and this optical input will also be converted into the electric signal. However the traffic signal is modulated with a control tone of 10 kHz and this tone is not present in the noise or the pump radiation. Therefore the 10 kHz component of the output of the detector 17 represents the traffic signal. If the amplitude of the 10 kHz tone falls to zero this indicates that the traffic signal has vanished. The output of the detector 17 passes to an electronic processor 18 which includes a band pass filter for the 10 kHz tone. The pass band of the filter should be wide enough to allow for drift but it should be not so wide that unwanted noise will pass the filter. Thus the output of band pass filter represents the traffic signal, even though pump radiation and other noise is detected by the optical detector 17.

The level of the control zone is passed to the pump control unit 15 which operates to maintain the level of the control tone at a preset value. If the level falls below the preset value the control unit 15 increases the power to the pump 14 whereby the intensity of pump radiation is increased. This increases the gain in the amplifier 12 which has the effect of increasing the level of the control tone to the preset value. Similarly, if the level of the control tone exceeds a preset value, the control unit 15 reduces the power to the pump and thereby reduces the level of control tone into the preset value. Thus the processor 18 and the control unit 15 constitute an AGC means which keeps the level of control tone constant. Since the first transmission unit provides a constant percentage of modulation, the effect is that the traffic signals are maintained at a preset level, and the circuit operates as an AGC. Because it uses control tone, the extraneous effects of noise on the AGC are minimised.

The control unit 15 includes a limiter to prevent excessive power being provided to the pumps, i.e. to prevent the pumps being damaged by overload. The power limiter comes into operation because the level of control tone from the processor 18 has fallen below a threshold level. For example, the level of control tone may have fallen to zero because the transmission fibre providing input to the input port 10 has been broken. The fact that the limiter has come into operation is, therefore, an indication of a serious malfunction upstream of the splitter 16. Therefore the control unit 15 provides a warning signal on the line 27 which is connected to a distress transmitter which will now be described.

The distress transmitter 21 comprises an optical transmitting element 22, which may be either a laser or an LED, which when enabled produces optical signals suitable for transmission through the system. It may be convenient to use an LED which produces a wide band optical signal, so that, if drift occurs, some part of the signal will be within the bandwidth of the system. This helps to ensure that the distress signals are transmitted. If a narrow bandwidth laser is used then it is important to ensure that the wavelength produced by the laser remains within the bandwidth of the system. In any case, the transmitting element 22 produces a distress optical signal which is transmitted onward through the output port 11. The drive circuit of the transmitting element 22 includes an electronic oscillator 23 which produces a control tone of 10 kHz. Thus the optical signal produced by the transmitting element 22 has the correct system format and the control tone will be utilised by subsequent amplifiers so that their AGC's remain fully operational and transmit the signal. In addition the presence of the control tone will prevent subsequent amplifiers adopting the distress configuration.

In addition to the control tone which is amplitude modulated onto the output of the transmitting element 22, the distress transmitter includes a digital modulator 25 which digitally modulates the distress signal with information which includes the identity of the amplifier (stored in store 26). The digital modulation is repeated over and over again as long as the distress condition lasts. The repeated digital message comprises a package header to identify the beginning of each repetition, and a packet trailer for identifying the end of each repetition. In between the header and trailer there is located an identification word to identify the amplifier which originates the distress message. (If 8 bit words are used this provides 256 different identification words. This would be sufficient to provide a distinctive identification for every amplifier in a chain about 20,000 km long. It is unlikely that a chain of such length would ever be needed.)

In addition to the identification, the digital message may contain other codes to indicate the nature of a fault. For example a special code could be included to indicate that both pumps had failed. It will be appreciated that the failure of both pumps 14 would mean that there is no gain in the amplifier 12, and hence the default condition would develop. To provide this extra facility, a digital modulator 25 is connected to the control unit 15 by a line 27. This actuates the modulator 25 to include a status word, defining the operative state of the amplifier in any distress message. If the amplifier itself is defective, the status word indicates that the fault is located in the amplifier. If the amplifier is operable, the status word indicates that the fault occurs before the input pork 10, e.g. in the transmission fibre.

The power to operate the components (22, 23, 25 and 26) of the distress transmitter 21 is provided via switching means 24. The switching means 24 is operatively connected to processor 18. As long as the level of the control tone is above a predetermined level, the switching means 24 is "off" and the distress transmitter 21 is disabled because it has no power. If the level of control tone falls below the predetermined level, the switching means 24 is "on" and the distress transmitter 21 receives power whereby it is enabled to transmit a distress message as described above. So long as the level of control tone remains low, power is supplied to pump 14.1 or 14.2 at a safe maximum level. This means that the amplifier is retained in an operative state, so that, when traffic or distress messages are received, the processor 18 will again detect control tone above the predetermined level. Thus the switching means 24 will be returned to the "off" configuration, the transmission of a distress message will cease, and normal operation will be resumed. Thus the processor 18 can switch from "normal" to "distress" operation, and from "distress" operation to "normal" operation as necessary. This ability will be utilised when the amplifier is first switched on.

A submarine system may require a substantial number of amplifiers, e.g. a long system will require 40 or 50 amplifiers. Using amplifiers as shown in FIG. 1 it is possible and convenient that all the amplifiers have identical circuitry which clearly simplifies the production of the system. In fact that only difference between the amplifiers is the identify word which is stored in the storage location 26. It is a simple matter to load the identity when the amplifiers are being assembled into the system.

Figure 2:
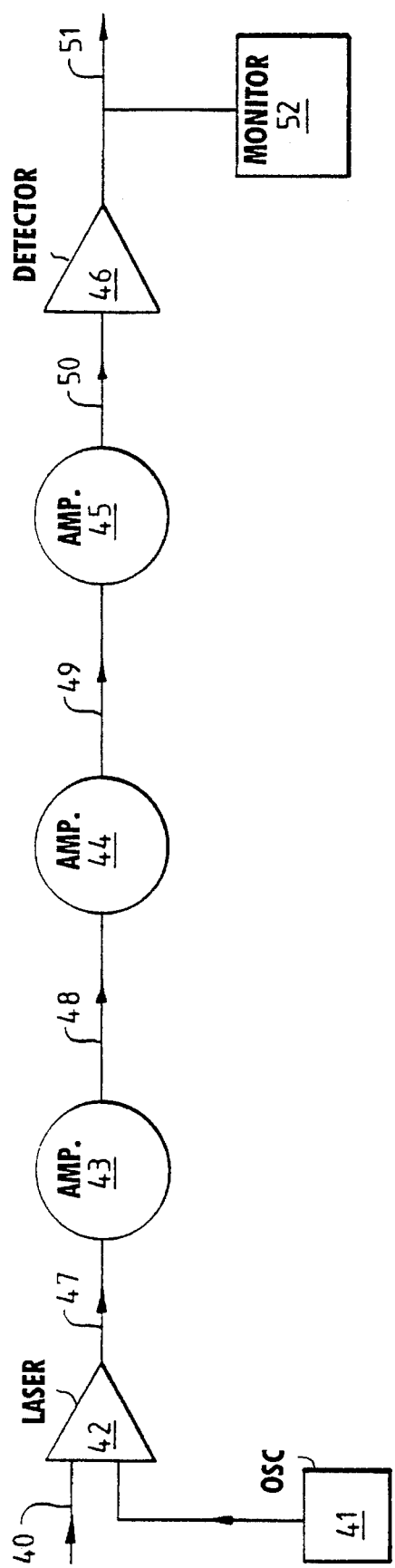
FIG. 2 illustrates a pair of telecommunication linkages for two-way communication.

FIG. 2 shows a single optical linkage suitable for telecommunications. The linkage comprises three amplifiers 43, 44 and 45 each of which is as shown in FIG. 1. In fact all three amplifiers are identical except for the identification stored in location 26. Amplifier 43 is connected to amplifier 44 by an optical fibre 48 and amplifier 44 is connected to amplifier 45 by an optical fibre 49. Traffic is transmitted into the line by a laser 42 which is connected to amplifier 43 by a fibre 47. Traffic initiated by the laser 42 is received at a detector 46 which is connected to amplifier 45 by a fibre 50. The laser 42 is located on one side of a body of water whereas the detector 46 is located on the other side of the body. Fibres 47, 48, 49 and 50 will usually be 80–100 km long so that the complete link is about 300–400 km long. Thus, even with only four amplifiers the link provides transmission across a substantial body of water. The chain could be extended to include 50 or more amplifiers, in which case the link would provide communication across a substantial ocean.

The laser 42 is connected by a suitable switching centre, to the public switched network of its land area. It receives telecommunications traffic on the line 40 and this traffic is digitally modulated onto the optical output of laser 42 so that the traffic is transmitted across the link. The bias current to laser 42 is modulated with a 10 kHz tone by the oscillator 41, and therefore, all the optical signals in the link are modulated with this tone. This zone is used to operate the AGC of each amplifier 43, 44, and 45 and this feature has been described above with reference to FIG. 1. The detector 46 converts the optical signals into electrical signals which are provided onto a line 51 into a public switched network. Thus the link shown in FIG. 2 provides connection between the two public switched networks.

As is usual in telecommunications practice, the traffic in the line 51 is monitored by equipment 52, which can distinguish between the presence and absence of traffic on the line 51. The monitoring equipment 52 would also detect the case where, owing to a malfunction in line 40 the traffic is being scrambled. This equipment operates because it can recognise various synchronisation codes and various parity checks which are included in the traffic. The operation of the link shown in FIG. 2 can now be described.

Under normal operation traffic from the line 40 and control tone from the oscillator 41 are both transmitted along the whole line until detected by the detector 46. The control tone from the oscillator 41 actuates all the AGC's and thereby keeps the line under satisfactory operation. The traffic is validated by the monitoring equipment 52 and it is distributed to the public switched network via the line 51 and no alarms are given. If a fault occurs, e.g. if the fibre 48 breaks, then the traffic disappears because it cannot be transmitted through the break. The monitoring equipment 52 will detect the absence of traffic and issue an alarm. In addition, amplifier 44 will receive no control tone from the oscillator 41 and, therefore, the amplifier will adopt the distress configuration and transmit a distress signal modulated with control tone. Therefore amplifier 45 will receive control tone and it will remain in the normal configuration and transmit the distress signal via fibre 50 to the detector 46. The optical signal will be modulated with a digital distress signal from amplifier 44 but this will not conform to the traffic specification and, therefore, the alarm state will remain operative. On examining the output from the detector 46 the distress message from amplifier 44 will be recognised. If the distress packet indicates pump (or other) failure in amplifier 44 the location of the problem has been diagnosed. If the distress packet indicates that the amplifier 44 is still operable this is an indication that fibre 48 is broken. In either case the distress package provides a valuable diagnostic aid in ascertaining the location of the fault. It should be noted that loss of traffic will initiate an alarm even if the amplifiers do not include distress signalling. The invention is concerned with indicating the location of the fault.

It will be appreciated that the linkage shown in FIG. 2 is a one-way linkage because the AGC's of the amplifiers are only capable of operating in one direction. In order to provide two-way communication between the terminals, it is necessary to have a second line as shown in FIG. 2 but having its direction reversed. Because the individual linkages are one-way, it is usual for a telecommunications system to include an even number of linkages so that half are used in one direction and half in the other. This arrangement provides equal traffic capacity in both directions.

Figure 3:
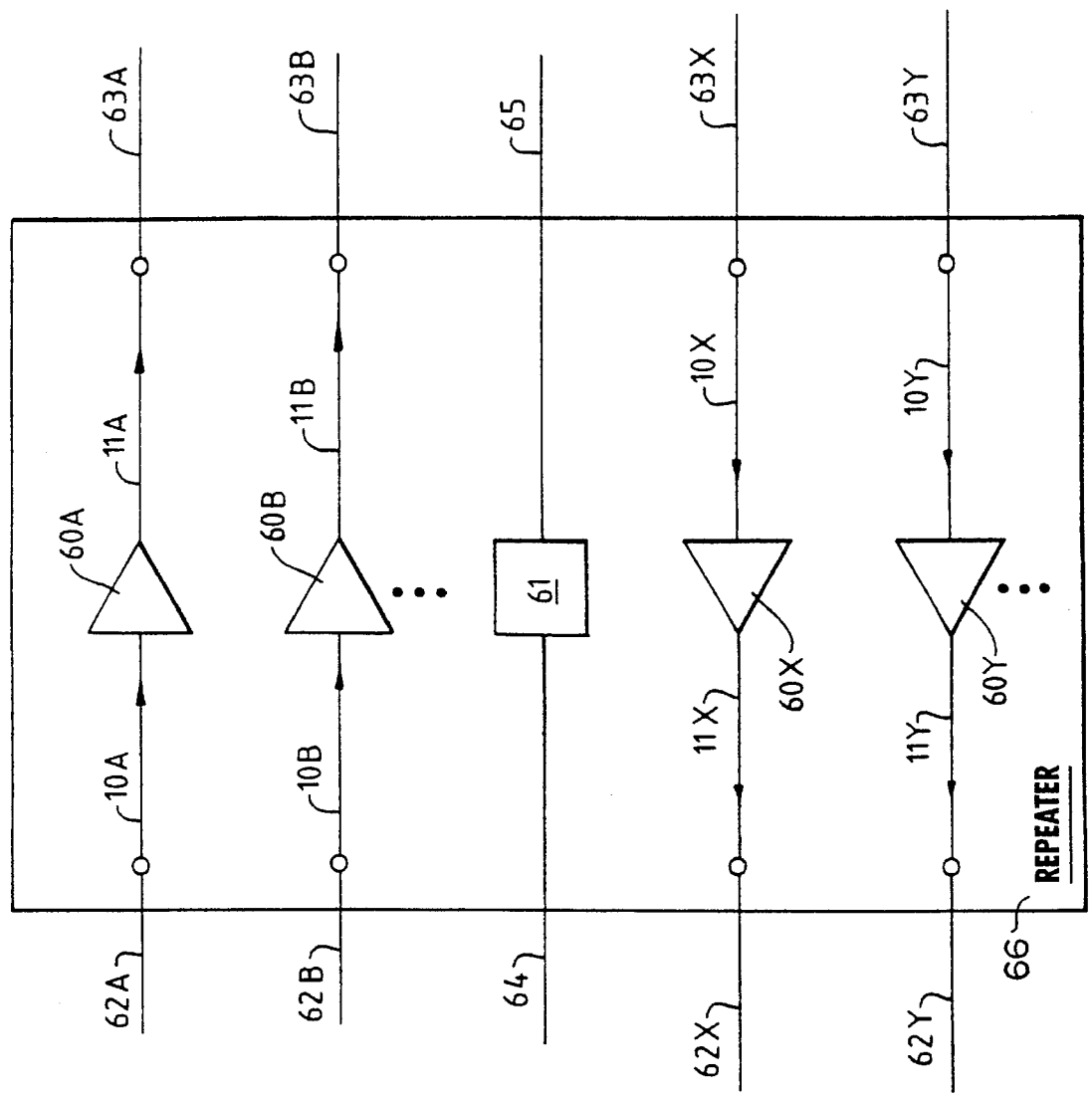
FIG. 3 is a repeater which includes four (or six or eight as indicated by dots under the two pairs of amplifiers shown in full) amplifiers in accordance with the invention.

An amplifier cannot be placed directly in the ocean because it needs to be protected. This protection is achieved by placing the amplifiers in a protective hull, and the hull usually contains a plurality of amplifiers. FIG. 3 constitutes a diagramatic illustration of a repeater.

The repeater 66 usually consists of a cylindrical, tubular hull which is about 0.5–2 m long and about 200–500 mm in diameter. To a large extent, the maximum dimensions of a repeater are controlled by the equipment carried on cable laying ships. As shown in FIG. 3, the repeater 66 is represented by a rectangle which contains four amplifiers, each of which is as described in FIG. 1. More specifically, the repeater 66 contains amplifiers 60A and 60B for transmission in one direction, and amplifiers 60X and 60Y for transmission in the opposite direction. The repeater 66 also contains a power unit 61 which is connected to each of the amplifiers to provide the electric power needed for operation. The repeater 66 is connected at its two ends to two submarine cables which contain a plurality of transmission fibres, an electric conductor and tensile wires to provide tensile strength. The tensile wires are connected to the hull of the repeater 66 so that, during laying, it is supported on the tensile wires and the optical and electrical components are not damaged. The input ports 10A and 10B of amplifiers 60A and 60B are connected to transmission fibres 62A and 62B in one of the submarine cables, similarly the output ports 11X and 11Y of amplifiers 60X and 60Y are connected to transmission fibres 62X and 62Y which are contained in the same submarine cable as fibre 62A and 62B. Similarly, at the other end of the repeater, output fibres 11A and 1ib are connected to transmission fibres 63A and 63B and input fibres 10X and 10Y are connected to transmission fibres 63X and 63Y. These are all contained in the other submarine cable to which the repeater 66 is attached. In addition, the power unit 61 is attached to the electrical conductors of the two submarine cables 64 and 65. Thus the power unit 61 receives its power from the submarine cables and it receives power from both sides. If one cable is cut, the amplifiers in the repeater 66 still remain active because it still receives power from the other side. It should be noted that the transmission fibres and the conductors all enter the repeater through watertight bulk heads. Thus the interior of the repeater 66 provides a satisfactory working environment for all its amplifiers even when the repeater is located on the sea bed, possibly at depths of as much as 5 km. FIG. 3 shows four amplifiers in the repeater but larger numbers, e.g. six or eight (i.e. three or four in each direction as indicated by dots under the two pairs of amplifiers shown in full) are more usual. It is convenient for all the amplifiers in the same repeater to have the same identification. When a break in a fibre occurs between two adjacent repeaters both repeaters will lose the tone control with the result that distress signals will be sent to both ends of the line. Thus it is possible to construct a submarine optical telecommunications system having from 3 to 60 repeaters.

I claim:

1. A photonic amplifier which includes:

an output port;

an input port;

amplifying medium connected between the input port and the output port;

a detector means; and a distress transmitter;

the detector means being capable of detecting valid signals which include a control tone modulated onto a traffic signal, in normal operation, on receipt of valid signals the detector means is adapted to disable the distress transmitter, and the distress transmitter when enabled to provide to the output port an optical distress signal which is recognizable as a valid signal and which is modulated with information which includes the identity of the amplifier, the optical distress signal not being routed through the amplifying medium.

2. A photonic amplifier according to claim 1, for use with signals modulated with a control tone, wherein the detector means is configured to disable the distress transmitter when control tone above a predetermined level is detected, and no enable the distress transmitter when control tone below the predetermined level is detected, and wherein the distress transmitter produces a distress signal modulated with control tone such that said distress signal disables the distress transmitters of similar amplifiers, to which the amplifier may be connected.

3. A photonic amplifier according to claim 1, wherein the amplifying medium is an optical fibre amplifier doped with a lasing species.

4. A photonic amplifier according to claim 3, in which the lasing species is Nd or Er.

5. A photonic amplifier according to claim 3, further comprising pump means operatively connected with the amplifier medium to supply pump radiation for maintaining laser amplifying conditions in the amplifier medium, wherein the detector means is responsive to the level of signals amplified in the amplifier medium, said detector means being operatively connected to the pump means so as to control the gain in the amplifier by varying the amount of pump radiation supplied to the amplifier medium whereby an AGC for controlling the amplifier is constituted, and, wherein the distress transmitter is connected to the output port for the onward transmission of the distress optical signals, and wherein the detector means is operatively connected to the distress transmitter so that the distress transmitter is disabled when the level of amplified signals exceeds a predetermined value, and wherein the distress transmitter is enabled when the level of amplified signals is less than the predetermined value.

6. A photonic amplifier according to any one of the preceding claims in which the optical distress signals are modulated digitally to thereby generate distress signals.

7. A repeater containing at least one photonic amplifier according to claim 1, the repeater comprising a waterproof hull containing at least one amplifier and a power supply for at least one amplifier wherein said repeater is adapted for connection to two submarine cables for the receipt of optical signals, electric power and for the onward transmission of signals amplified in the repeater.

8. A repeater according claim 7, which repeater contains four, six or eight amplifiers.

9. A submarine, optical, telecommunications system which comprises a plurality of repeaters according to claim 7 interconnected by means of submarine optical cables.

10. A submarine system according to claim 9, wherein the number of repeaters is from 3–60.

* * * * *